(12) United States Patent
Horii et al.

(10) Patent No.: US 7,926,608 B2
(45) Date of Patent: Apr. 19, 2011

(54) ELECTRIC-MOTOR THREE-WHEELED VEHICLE

(75) Inventors: Yoshiyuki Horii, Saitama (JP); Katsumi Sahoda, Saitama (JP); Naoki Kobayashi, Saitama (JP); Koji Aoki, Saitama (JP); Kuniaki Ikui, Saitama (JP); Takashi Sone, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 12/166,105

(22) Filed: Jul. 1, 2008

(65) Prior Publication Data

US 2009/0020352 A1 Jan. 22, 2009

(30) Foreign Application Priority Data

Jul. 18, 2007 (JP) ................................ 2007-187452

(51) Int. Cl.
*B60K 1/00* (2006.01)
(52) U.S. Cl. ..... 180/216; 180/210; 180/65.1; 180/65.51
(58) Field of Classification Search ........ 180/65.1–65.8, 180/216, 210, 311, 60; 429/22–25
See application file for complete search history.

(56) References Cited

U.S. PATENT DOCUMENTS

| | | | | |
|---|---|---|---|---|
| 848,267 A * | 3/1907 | Schmidt et al. | ................. | 180/60 |
| 4,135,593 A * | 1/1979 | Fowkes | ........................ | 180/65.1 |
| 4,798,400 A * | 1/1989 | Kosuge | ........................ | 280/796 |
| 5,094,313 A * | 3/1992 | Mauws | ........................ | 180/210 |
| 5,460,234 A * | 10/1995 | Matsuura et al. | ............ | 180/65.1 |
| 6,655,717 B1 * | 12/2003 | Wang | ............................. | 280/781 |
| 6,860,349 B2 * | 3/2005 | Ogawa et al. | ............ | 180/65.225 |
| 6,986,401 B2 * | 1/2006 | Chernoff et al. | ............... | 180/311 |
| 7,017,685 B2 * | 3/2006 | Schoenberg | ............... | 180/2.1 |
| 7,108,091 B2 * | 9/2006 | Guidry et al. | ................ | 180/68.1 |
| 7,332,881 B2 * | 2/2008 | Clark et al. | .................... | 318/139 |
| 7,404,462 B2 * | 7/2008 | Tokumura et al. | ......... | 180/65.31 |
| 7,438,984 B2 * | 10/2008 | Aoyagi et al. | .................. | 429/12 |
| 7,506,708 B2 * | 3/2009 | Iwashita | ...................... | 180/65.1 |
| 7,527,112 B2 * | 5/2009 | Aoyagi et al. | ........... | 180/65.265 |
| 7,677,343 B2 * | 3/2010 | Kitai et al. | ................ | 180/89.17 |
| 7,717,220 B2 * | 5/2010 | Singh et al. | .................... | 180/312 |

(Continued)

FOREIGN PATENT DOCUMENTS

JP 2005-28988 A 2/2005

*Primary Examiner* — Paul N Dickson
*Assistant Examiner* — Nicole Verley
(74) *Attorney, Agent, or Firm* — Birch, Stewart, Kolasch & Birch, LLP

(57) ABSTRACT

An electric-motor three-wheeled vehicle includes a motor for applying a drive force to drive wheels, a motor control unit for controlling the motor, a secondary battery for storing electric power generated by a fuel cell, a rear body supporting a pair of left and right rear wheels and a connecting mechanism for connecting the rear body with a front body so as to tilt the front body while the rear wheels are in contact with the ground. The secondary battery is housed in the inside of a luggage carrier above the rear wheels. The motor and the motor control unit, including a motor driver and a main CPU, are mounted between the left and right rear wheels. The voltage converter increases or decreases the voltage of the electric power supplied from the fuel cell. The control drivers controls a supercharger of reaction gas and a electric pump of cooling water.

20 Claims, 5 Drawing Sheets

U.S. PATENT DOCUMENTS

| | | | |
|---|---|---|---|
| 2005/0214605 A1* | 9/2005 | Saitoh et al. | 429/22 |
| 2006/0180383 A1* | 8/2006 | Bataille et al. | 180/311 |
| 2006/0289224 A1* | 12/2006 | Ono et al. | 180/311 |
| 2007/0215397 A1* | 9/2007 | Suzuki | 180/65.3 |
| 2007/0289792 A1* | 12/2007 | Bataille et al. | 180/89.17 |
| 2008/0115995 A1* | 5/2008 | Holland | 180/216 |

* cited by examiner

ELECTRIC-MOTOR THREE-WHEELED VEHICLE

CROSS-REFERENCE TO RELATED APPLICATIONS

The present application claims priority under 35 USC 119 to Japanese Patent Application No. 2007-187452 filed on Jul. 18, 2007 the entire contents of which are hereby incorporated by reference.

BACKGROUND OF THE INVENTION

1. Field of the Invention

The present invention relates to electric-motor three-wheeled vehicles. More particularly, to an electric-motor three-wheeled vehicle that can reduce power loss during power transmission by providing an arrangement of drive-train electric components for enabling a satisfactory vehicle body layout.

2. Description of Background Art

Various electric vehicles are known which each have a motor as a drive source. Such electric vehicles need various drive-train electric components, such as a drive motor, a secondary battery and a motor control unit for driving the motor, which are not included in an engine vehicle. Fuel cell-powered vehicles include a fuel cell which generates electric power through the chemical reaction between hydrogen as fuel gas and oxygen contained in reaction gas (air) and drive a motor with the electric power supplied from the fuel cell. The fuel cell-powered vehicles need to incorporate a supercharger for reaction gas, a motor control driver for a fuel cell-cooling water pump, a voltage converter for increasing or decreasing the voltage of electric power supplied from the fuel cell. In particular, for straddle type vehicles with a small excess space, a method of arranging such electric components has a large influence on vehicle body layout.

Japanese Patent Laid-Open No. 2005-28988 discloses a straddle type fuel cell-powered motorcycle configured wherein an almost rectangular parallelepipedic fuel cell is disposed in the lower portion of a vehicle body so as to orient its longitudinal direction in the back and forth direction of the vehicle body. An almost cylindrical hydrogen cylinder is disposed above the fuel cell. In addition, electrical components are concentrated and installed rearward of the seat and above a rear wheel.

However, in the configuration of Japanese Patent Laid-Open No. 2005-28988, since the electric components are disposed remote from the fuel cell, the drive motor and the like, the wiring used to connect the components is long. In addition, the vehicle body configuration of the electric-motor vehicle may be a scooter type three-wheeled vehicle that has a low floor type foot rest portion disposed between a steering handlebar and a seat and is provided with two rear wheels. In such a case needs an arrangement method different from that of the motorcycle as in Japanese Patent Laid-Open No. 2005-28988 is required.

SUMMARY AND OBJECTS OF THE INVENTION

It is an object of an embodiment of the present invention to solve the problem of the conventional technique mentioned above and to provide an electric-motor three-wheeled vehicle that can reduce power loss during power transmission by devising the arrangement of drive-train electric components for enabling a satisfactory vehicle body layout.

To achieve the object according to an embodiment of the present invention, an electric-motor three-wheeled vehicle includes a motor for applying a drive force to drive wheels, a motor control unit for controlling the motor, a secondary battery which stores electric power, a rear body rotatably supporting a pair of left and right rear wheels as the drive wheels and a connecting mechanism for swingably connecting the rear body with a front body so as to tilt the front body from side to side while the rear wheels are brought into contact with the ground. The secondary battery is disposed above the rear wheels. The motor control unit includes at least a motor driver and a CPU with the motor and the motor control unit being provided between the left and right rear wheels in the rear body.

According to an embodiment of the present invention, a fuel cell for generating electric power resulting from the chemical reaction between the fuel gas and the reaction gas is provided in the front body, and the secondary battery stores the electric power generated by the fuel cell.

According to an embodiment of the present invention, a voltage converter increases or decreases the voltage of the electric power supplied from the fuel cell and the voltage converter is disposed between the left and right rear wheels in the rear body.

According to an embodiment of the present invention, an actuator at least includes a supercharger for supplying the reaction gas to the fuel cell and an electric pump for supplying under pressure cooling water of the fuel cell. A control driver controls the actuator and is disposed between the left and right rear wheels in the rear body.

According to an embodiment of the present invention, the voltage converter and the control driver are concentratedly arranged adjacently to each other.

According to an embodiment of the present invention, the rear body is provided with a protection member that externally surrounds at least a portion of electric components mounted between the left and right rear wheels.

According to an embodiment of the present invention, the secondary battery is disposed above the rear wheels, the motor control unit includes at least the motor driver and the CPU, and the motor and the motor control unit are provided between the left and right rear wheels in the rear body. Thus, the drive-train electric components and the secondary battery are concentratedly arranged close to the rear wheels, which can reduce the length of wiring needed for connecting the electric components with each other. This can reduce power loss during power transmission from the secondary battery. In addition, since the motor and the motor control unit are disposed between the left and right rear wheels, the body layout having satisfactory left-right weight balance of the vehicle body can be provided. Further, since the motor and the motor control unit are provided in the rear body that is not tilted even during turn-traveling, they can be protected against lateral swing.

According to an embodiment of the present invention, the fuel cell is provided which generates electric power resulting from the chemical reaction between filet gas and reaction gas, the fuel cell is provided in the front body, and the secondary battery stores the electric power generated by the fuel cell. The drive-train electric components and the secondary battery are concentratedly arranged close to the rear wheels and the fuel cell is disposed in the front portion of the vehicle body. Thus, the fuel cell-powered three-wheeled vehicle having a satisfactory anteroposterior weight balance of the vehicle can be provided.

According to an embodiment of the present invention, the voltage converter is provided which increases or decreases the voltage of the electric power supplied from the fuel cell and it is disposed between the left and right rear wheels in the rear body. Thus, the drive-train electric components are concentratedly arranged to need short wiring connecting the electric components with each other, which can reduce power loss during power transmission. In addition, since the voltage converter tends to be heavy and is disposed between the left and right rear wheels, the body layout of a satisfactory left-right weight balance for the vehicle body can be provided.

According to an embodiment of the present invention, provided are the actuator at least including the supercharger which supplies the reaction gas to the fuel cell and the electric pump which supplies under pressure cooling water of the fuel cell and the control driver which controls the actuator. The control driver is disposed between the left and right rear wheels in the rear body. Thus, the electric components are further concentratedly arranged, which needs the short wiring connecting the electric components with each other, making it possible to reduce power loss during power transmission. In addition, since many drive-train electric components are mounted to the rear body, the front portion of the vehicle body causes an excess space, which can increase the flexibility of the body layout.

According to an embodiment of the present invention, since the motor control unit, the voltage converter and the control driver are concentratedly arranged adjacently to each other, the volume occupied by the electric components can easily be reduced and power loss during power transmission can further be reduced. In addition, since the plurality of electric components are concentratedly arranged, assembly man hours can be reduced compared with the configuration where the plurality of electric components are installed in a distributed manner.

According to an embodiment of the present invention, the rear body is provided with the protection member that externally surrounds at least a portion of the electric components mounted between the left and right rear wheels. Thus, the electric components such as the motor control unit and the voltage converter can be protected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
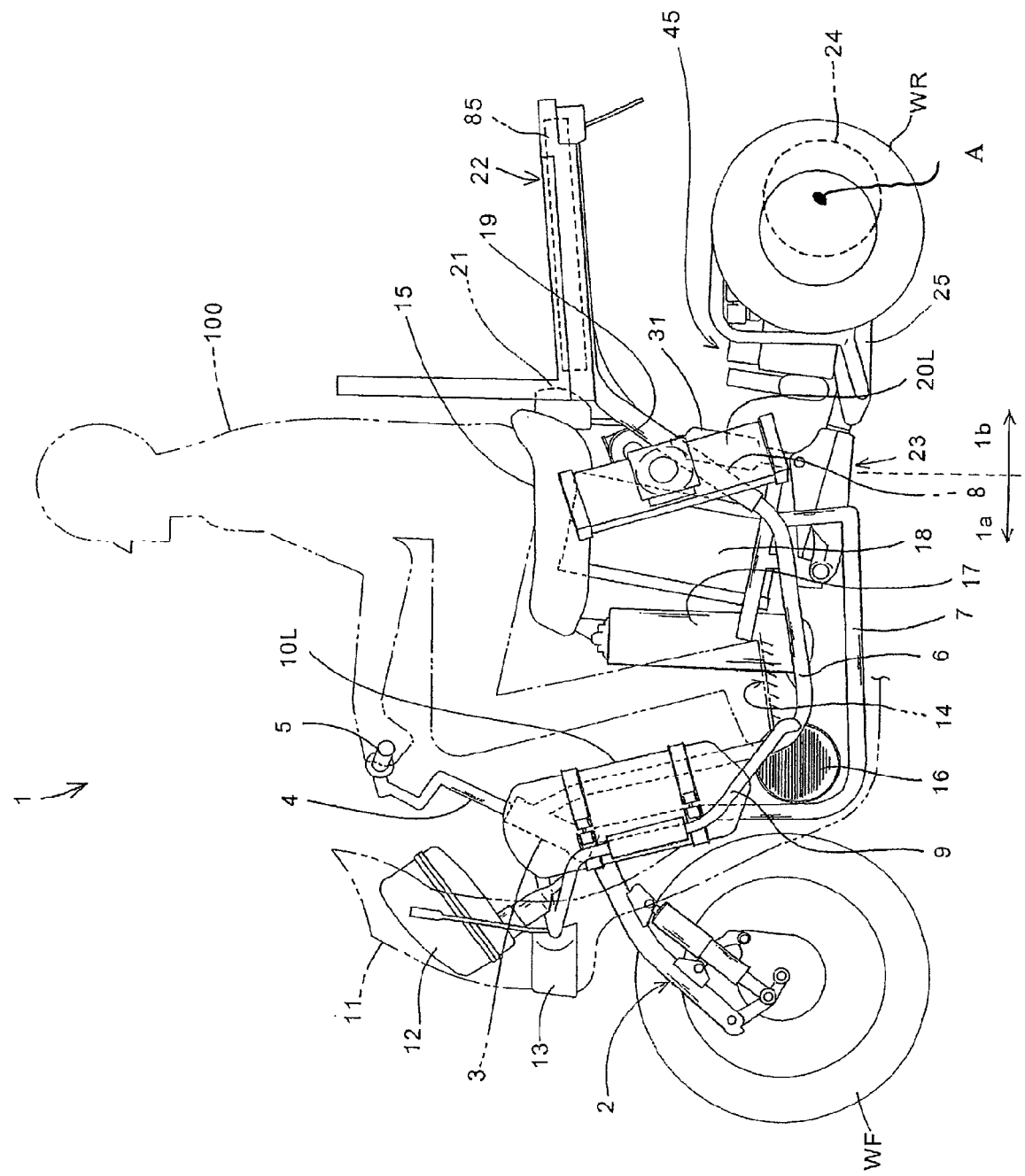
FIG. 1 is a lateral view of an electric-motor three-wheeled vehicle according to an embodiment of the present invention.
Figure 2:
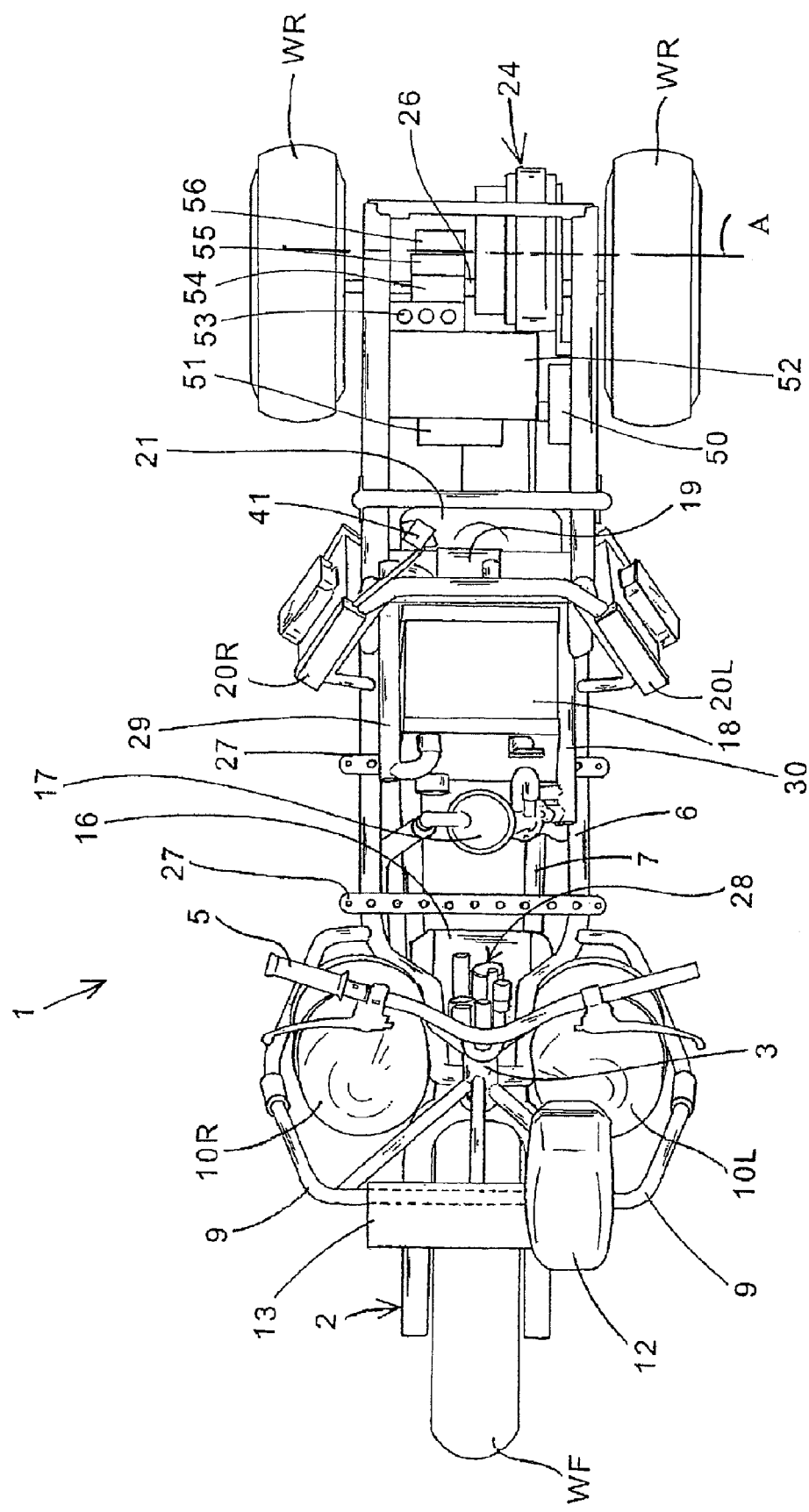
FIG. 2 is a plan view of the three-wheeled vehicle of the embodiment of the invention.

Preferred embodiments of the present invention will hereinafter be described in detail with reference to the drawings. FIGS. 1 and 2 are a lateral view and a plan view, respectively, of a straddle type fuel cell-powered vehicle 1 according to an embodiment of the present invention. The straddle type fuel cell-powered vehicle 1 is an electric-motor three-wheeled vehicle which includes one front wheel WF as a steering wheel and two rear wheels WR spaced apart in a vehicle-width direction and driven by a motor. This fuel cell-powered vehicle 1 has a scooter type vehicle body configuration provided with a low-floor type foot rest portion between a steering handlebar and an operator's seat. The fuel cell-powered vehicle 1 is provided with a fuel cell power generation system including a cell stack in which a plurality of cells are stacked to constitute a fuel cell, a fuel (hydrogen) gas supply system for supplying hydrogen gas as fuel to the cell stack and a reaction gas supply system for supplying a reaction gas (air) containing oxygen to the cell stack. The vehicle 1 is driven by the motor driven by the electric power of the fuel cell or by electric power supplied from a secondary battery storing electric power.

A steering stem 4 supporting a bottom link type front suspension 2 is turnably supported by a head pipe 3 located at the front end of a body frame. The front wheel WF as a steering wheel is rotatably supported by the lower end of the front suspension 2. The front wheel WF can be steered by a steering handlebar 5 coupled to the steering stem 4. A pair of left and right main frames 6 connected to the steering stem 4 are formed to extend downward rearward, then largely bending at the lower portion of a vehicle body, and extend toward the rearward of the vehicle body. A pair of left and right under frames 7 are disposed below the respective main frames 6 so as to be formed to extend along them. Similarly to the main frames 6, also the under frames 7 connected to the head pipe 3 are formed to extend downward rearward, then largely bending at the lower portion of the vehicle body, and extend toward the rearward of the vehicle body. The rear end portions of the under frames 7 largely bend upward and are joined to the respective main frames 6. The rear end portions of the main frames 6 rearward of the joint portions are connected to the rear frames 8 carrying a luggage carrier 22 on the rear side of the vehicle body. A secondary battery 85 adapted to store the electric power generated by the fuel cell 18 is housed in the inside of the luggage carrier 22.

An almost rectangular parallelepipedic fuel cell 18 is mounted at a position below a seat 15 on which an occupant 100 sits in such a manner as to be slanted at a predetermined angle (e.g. 30 degrees) toward the rearward of the vehicle body. Radiators 20L and 20R adapted to cool the fuel cell 18 are arranged adjacent to each other on the left and right, respectively, of the fuel cell 18 in the vehicle-width direction. An electric pump 19 as an actuator is arranged on the backside of the fuel cell 18 to supply under pressure the cooling water to the radiators. A humidifier 17 is mounted on the front side of the fuel cell 18 so as to humidify reaction gas supplied to the fuel cell 18. The almost cylindrical humidifier 17 is disposed below the seat 15 and at the center of the vehicle-width direction.

The low floor type foot rest portion 14 is provided between the seat 15 and the steering handlebar 5. The foot rest portion 14 is configured such that a flat floor surface on which the occupant's feet are placed is made resin or the like and is formed symmetrical in the vehicle-width direction. Stays 27 are attached on the upper surfaces of the main frames 6 at respective positions forward of and rearward of the humidifier 17 so as to support the resin plate of the foot rest portion 14. A super charger 16 is disposed in a space surrounded by the main frames 6 and under frames 7 and at a position forward of and downward of the foot rest portion 14. The super charger 16 serves as an actuator adapted to supply under pressure reaction gas to the fuel cell 18.

The vehicle body of the straddle type fuel cell-powered vehicle 1 is made up of a front body 1a and a rear body 1b connected to the front body 1a. The front body 1a is a front portion of the vehicle body including the body frame and the front wheel WR. The rear body 1b including the rear wheels WR and the front body 1a are connected by a connecting mechanism 23. A shock unit 31 is attached to an attachment frame (see FIG. 3) provided between a portion of the connecting mechanism 23 and the pair of left and right rear frames 8 to absorb vertical shock. A Neidhardt swing mechanism using a rubber damper is applied to the connecting mechanism 23. This makes it possible to turnably operate the vehicle with the front body 1a banked while the two rear wheels WR are brought into contact with the road surface. A drive motor and a reduction mechanism which apply a drive force to the rear wheels WR are integrally accommodated in a power unit 24. The power unit 24 is mounted rearward of a base member 25 of the rear body 1b and between the left and right rear wheels WR. The drive force outputted from the power unit 24 is transmitted to the rear wheels WR by the axle 26. A plurality of drive-train electric components 45 such as a motor control unit are mounted between the rear wheels WR of the rear body 1b. The drive-train electric components 45 include a motor driver 50 as the motor control unit, a DC-DC converter 51, a voltage converter 52, a main CPU 53, control drivers 54, 55, and a fuse box 56. An arrangement structure of the drive-train electric components 45 are described later in detail.

A pair of left and right hydrogen cylinders 10L, 10R are mounted on the left and right, respectively, of the head pipe 3 in the vehicle-width direction so as to place the main frames 6 and under frames 7 therebetween from the left and the right, respectively. The hydrogen cylinders 10L, 10R as fuel tanks are surrounded from the front and side by guide pipes 9 joined to the main frames 6. An air cleaner box 12 is disposed forward of and upward of the left-hand hydrogen cylinder 10L in order to filer fresh air (air) which becomes reaction gas. The vehicle is covered from the front side by a cowling 11 as an external component formed of a thin resin plate or the like. A protection pad 13 attached from the front to the guard pipe 9 is partially arranged to face the outside via an opening portion formed in the cowling 11.

The left and right radiators 20L, 20R are mounted to slant their upper portions forwardly as viewed from the side of the vehicle body. In addition, they are mounted such that their flat portions receive an air flow from the front of the vehicle body and are slanted inwardly of the vehicle body in order to make it easy to receive the air flow during operation of the vehicle. A cooling water reservoir tank 21 is mounted on the rear upper portion of the fuel cell 18 and a hydrogen sensor 41 is mounted on the upper portion of the reservoir tank 21.

A hydrogen supply unit 28 including a control unit for controlling the amount of hydrogen supplied to the fuel cell 18 is disposed in a space between the left and right hydrogen cylinders 10L, 10R and is surrounded by the left and right main frames 6 and under frames 7. An intake side manifold 29 and an exhaust side manifold 30 are connected to the fuel cell 18. The intake side manifold 29 is adapted to supply the reaction gas humidified by the humidifier 17 to the fuel cell 18 from the upper portion thereof The exhaust side manifold 30 is adapted to discharge, from the lower portion of the fuel cell 18, the unreacted gas that did not react in the inside of the fuel cell 18.

Figure 3:
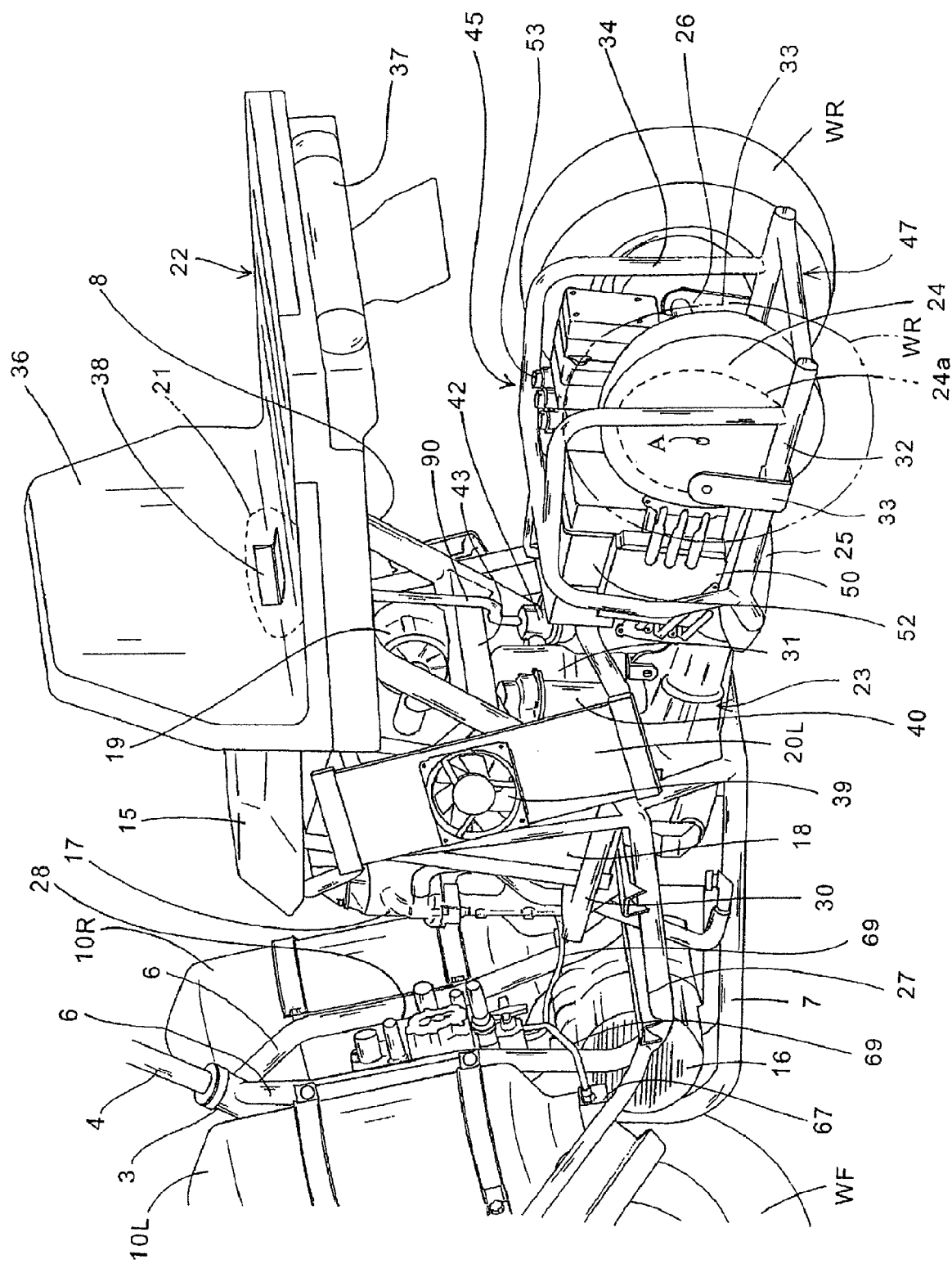
FIG. 3 is a perspective view of the three-wheeled vehicle as viewed from the left rearward.

FIG. 3 is a perspective view of the straddle type fuel cell-powered vehicle 1 as viewed from the left rearward. In FIG. 3, the left rear wheel WR is removed. The same reference numerals as in the above refer to like or corresponding parts. The left and right hydrogen cylinders 10L, 10R are each attached with a block-like plug member 67 at a lower end. Hydrogen gas is supplied under pressure to the hydrogen supply unit 28 via hydrogen gas supply pipes 69 attached to the plug members 67. The hydrogen supply unit 28 is disposed at a position facing the humidifier 17 through the occupant's foot rest portion 14 so as to be hidden between the left and right hydrogen cylinders 10L and 10R and between the main frames 6. An electric fan 39 is attached to each of the radiators 20L and 20R which are adjacently disposed to put the fuel cell 18 therebetween from the left and right, respectively.

An ion exchanger 40, the shock unit 31 and a cooling water thermostat 42 are disposed below the electric pump 19 disposed on the rear portion of the fuel cell 18. The ion exchanger 40 is adapted to remove desired ions in cooling water to suppress electric conductivity of the cooling water to a low level. The shock unit 31 is mounted between the connecting mechanism 23 and an attachment frame 43. The thermostat 42 is a device for preventing under cooling of the fuel cell 18 by switching cooling water routes on the basis of cooling water temperature. In addition, the thermostat 42 is attached at an upper portion with an air-bleeding pipe 90 adapted to discharge the air mixed with the cooling water to the reservoir tank 21.

The luggage carrier 22 supported by a seat frame 8 is configured to be provided with an upright portion on the front side of the flat floor portion on which luggage is loaded. The upright portion 36 is adapted to fix the luggage close to the front side of the floor portion. An opening portion 38 is provided at the vehicle-widthwise center of the lower portion of the upright portion 36 in order to view a portion of the reservoir tank 21. This makes it possible to check the capacity of cooling water from the external side of the vehicle body. The upright portion 36 may be made to function as a backrest of the occupant 100. A tail lamp device 37 integrally composed of a brake lamp and direction indicator lamps is attached to the rear end of the luggage carrier 22.

A rear frame 47 is connected to the base member 25 of the rear body 1b connected to the front body 1a via the connecting mechanism 23. The rear frame 47 is configured such that sub-frames 34 are provided to extend upright from the corresponding upper sides of base frames 32. The base frames 32 constitute a lower frame serving as a main framework. The sub-frames 34 increase the rigidity of the framework made up of the base frames 32. The sub-frames 34 are arranged to surround the drive-train electric components 45 mounted to the base member 25 and function as protection members to protect the electric components 45 from the force applied from the outside: The power unit 24 incorporating the drive motor 24a, a motor driver 50 as a motor control unit which controls the drive motor 24a, a voltage converter (VCU) 52 for increasing or decreasing the voltage supplied from the fuel cell 18 as well as the drive-train electric components 45 are adjacently and concentratedly arranged in the space surrounded by the base frames 32 and the sub-frames 34. A pair of left and right axle holders 33 are respectively attached to the base frames 32 to support the axles 26 of the rear wheels WR. Further, as can be seen FIGS. 1-3, motor 24 has an axial centerline A located further toward a rear of the vehicle 1 than a position of a rear axle 26 on which the rear wheels WR are mounted.

Figure 4:
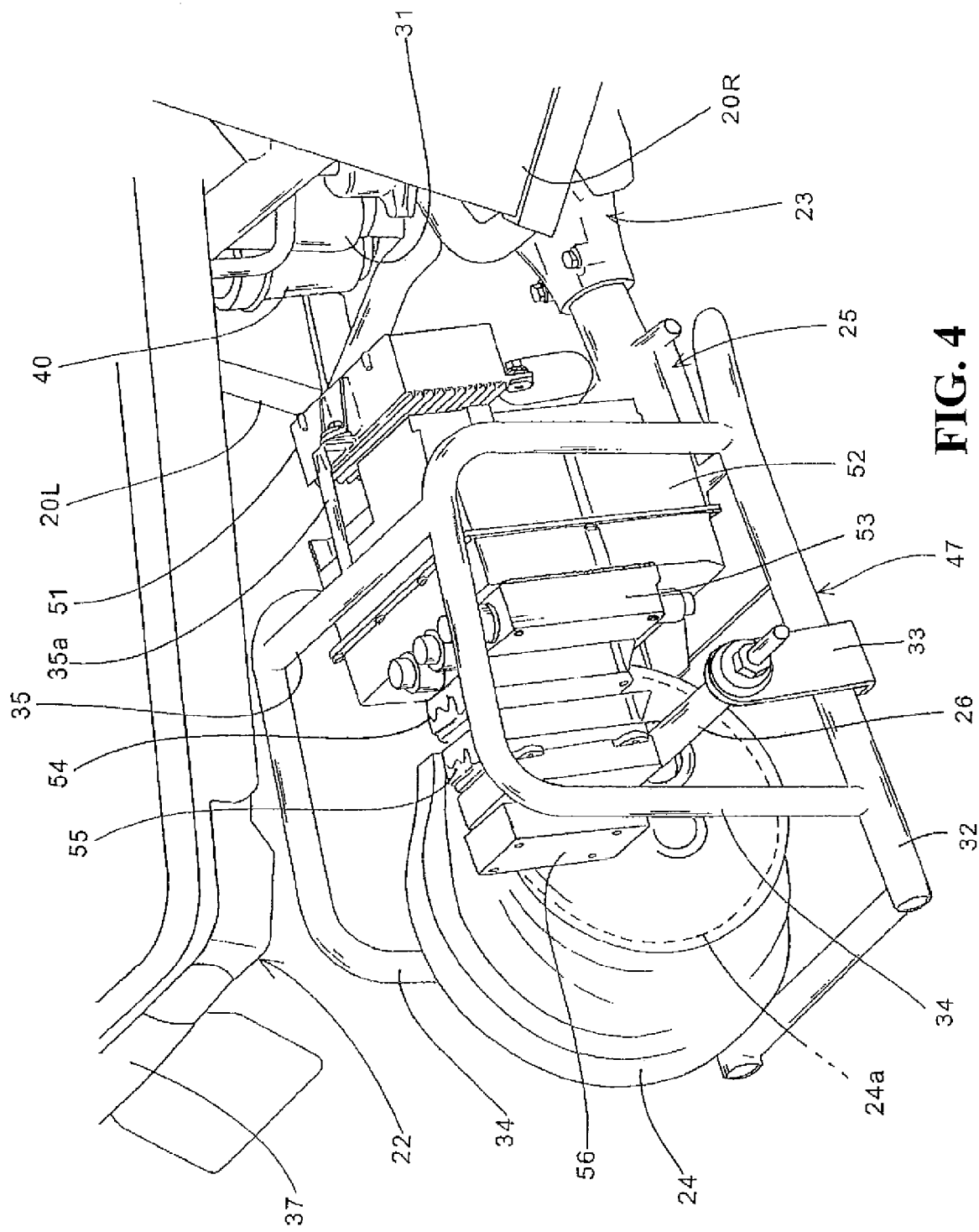
FIG. 4 is a perspective view of a rear frame as viewed from the right of the vehicle.

FIG. 4 is a perspective view of the rear frame as viewed from the right of the vehicle. In FIG. 4, both the rear wheels WR are removed. As described above, the rear frame 47 is configured such that the sub-frames 34 functioning as the protection members are attached to the upper portion of the framework formed of the base frames 32. The drive-train electric components of various sizes formed in an almost rectangular parallelepiped are arranged to be adjacent to each other in the space surrounded by the base frames 32 and the sub-frames 34 so as to be aligned with each other from the front side of the vehicle body. The electric components are aligned in the following order from the front side of the vehicle body a DC-DC converter 51 for converting the voltage value of the DC-electricity into a predetermined value, the voltage converter 52, the main CPU 53 as a motor control unit, the control driver 54 for driving the supercharger 16, the control driver 55 for driving the electric pump 19, and the fuse box 56 housing a plurality of fuses. In the present embodiment, the motor control unit for controlling the drive motor 24a is composed of the motor driver 50 and the main CPU 53. In addition, the motor control unit, the voltage converter 52, the control drivers 54, 55 can integrally be formed by being housed in an integral cover or by other means. In the present embodiment, no connection pipe or the like is provided at the rear portion of the rear frame 47 so that the rear portion of the rear frame 47 opens outwardly. Therefore, it is easy to access the inside of the rear frame, which facilitates the maintenance of the drive-train electric components.

In the embodiment as described above, the luggage carrier 22 housing the secondary battery 85 is disposed above the rear wheels WR and the drive motor 24a and the motor control unit are disposed between the left and right rear wheels WR of the rear body 1b. Thus, the electric components can concentratedly be arranged close to the rear wheels WR. This needs short wiring extending from the secondary battery 85 to the motor control unit and drive motor 24a via the electric components, whereby power loss can be reduced during power transmission. Since the drive motor 24a and the motor control unit are disposed between the left and right rear wheels WR, a body layout is provided that has satisfactory left-right weight balance for the vehicle body. Further, since the rear body 1b is not banked during turning when the vehicle is traveling, the drive motor 24a and the motor control unit can be protected from swinging in the left-right direction.

With the arrangement configuration described above, since many drive-train electric components are concentratedly mounted, the wiring connecting the electric components with each other can be reduced in length, thereby reducing power loss during power transmission. In addition, since many electric components are mounted in the rear body, the flexibility of the body layout can be increased on the front side of the vehicle body. In the present embodiment, the motor control unit (the motor driver 50 and main CPU 53), the voltage converter 52, and the control drivers 54, 55 are concentratedly arranged adjacently to each other. This makes it easy to reduce the installation space for the drive-train electric components and can further reduce the power loss during power transmission. In addition, the assembly man hours can be reduced compared with the configuration where many electric components are arranged in a distributed manner.

The pair of left and right sub-frames 34 is connected to each other by the connecting pipe 35 as a protection member that extends vehicle-widthwise to protect the electric components from above. This further increases the rigidity of the rear frame 47. Since the protection member composed of the sub-frames 34 and the connecting pipe 35 is arranged between the rear wheels WR so as to surround the electric components including the motor control unit, it functions to protect them. A stay 35a which extends toward the front side of the vehicle body and supports the DC-DC converter 51 is joined to the connecting pipe 35. The rear lateral end of the power unit 24 is disposed to slightly project rearward from the framework of the base frames 32. However, if the rear wheels WR are attached, the rear ends of the rear wheels WR are located slightly rearward of the rear lateral end of the power unit 24. Thus, it is less probable that the power unit 24 comes into contact with foreign matter or the like.

Figure 5:
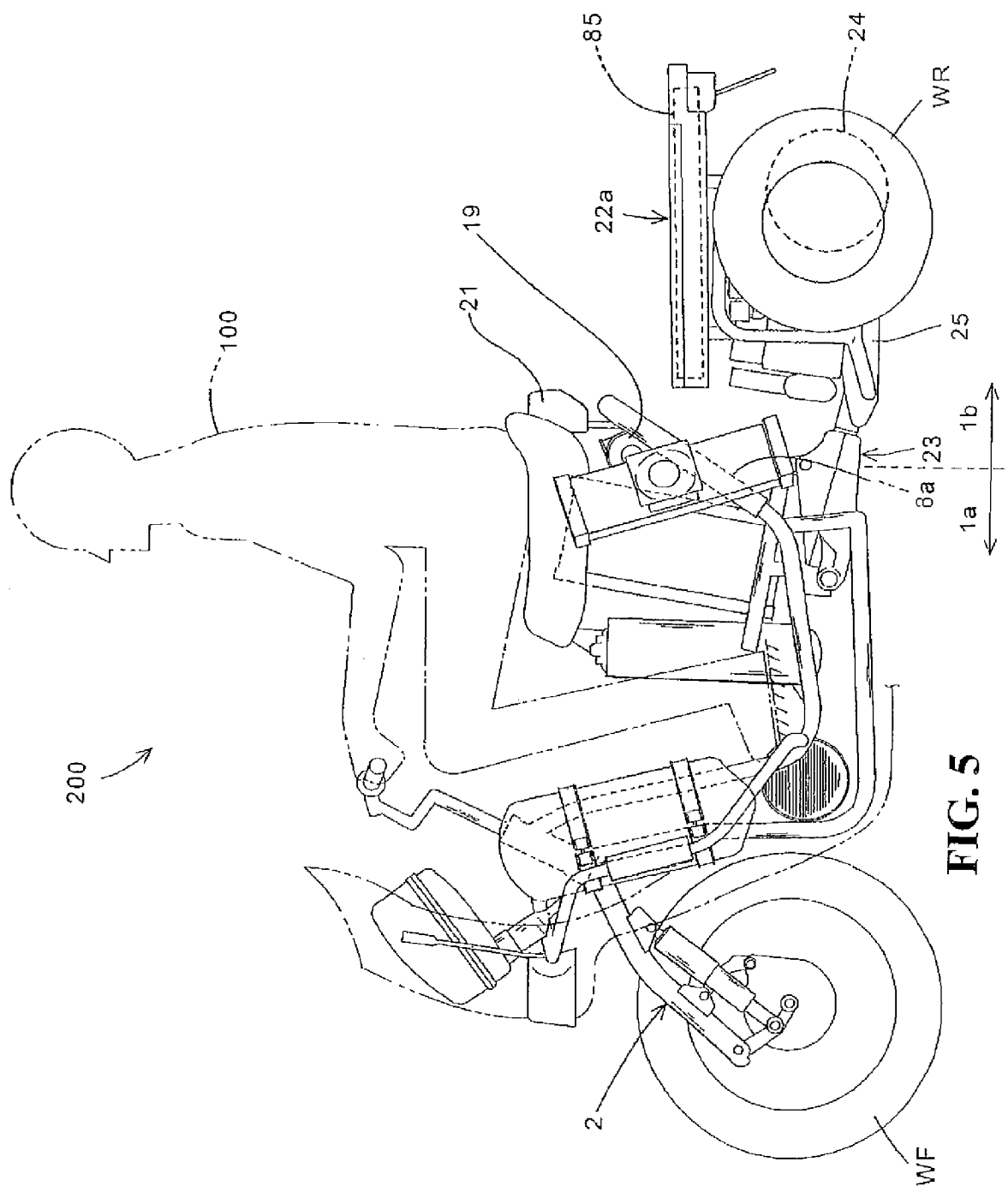
FIG. 5 is a lateral view of an electric-motor three-wheeled vehicle according a modified example of the embodiment of the invention.

FIG. 5 is a lateral view of a straddle type fuel cell-powered electric vehicle according to a modified example of the embodiment of the present invention. The same reference numerals as in the above refer to like or corresponding parts. A straddle type fuel cell-powered electric vehicle 200 according to the modified example is different from the vehicle of the embodiment only in the configuration of a luggage carrier. The modified example is characterized in that the luggage carrier 22a housing the secondary battery 85 is directly mounted on the upper portion of the rear body 1b. Because of this characteristic, the secondary battery 85 and the drive-train electric components are arranged further closer to each other. This makes it possible to reduce power loss during power transmission. Since the rear body 1b is covered from above by the luggage carrier 22a, the drive-train electric components can further be protected. In addition, since the secondary battery 85 can directly be mounted to the rear body 1b, it can be protected against lateral swinging. In addition, since the seat frames 8a can be reduced in length from the rear, a weight reduction can be achieved. Since the reservoir tank 21 is exposed to the outside, it is facilitated to check the capacity of cooling water and to replenish cooling water. In addition, the shape of the luggage carrier 22a can be modified in various manners. For example, an upright portion may be provided against which luggage is brought into abutment.

The type and shape of the drive-train electric component, the positions and order of the electric components arranged on the rear body, and the shapes of the frame members constituting the rear frame and the protecting member are not limited to the embodiment described above and can be modified in various ways. For example, the protecting member disposed between the rear wheels and the motor control unit may be formed of a plate like component or the like which covers the entire electric components. In addition, the electric-motor three-wheeled vehicle may be configured such that the power supply source to the drive motor is only a secondary battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric-motor three-wheeled vehicle comprising:
a drive motor for applying a drive force to drive wheels;
a secondary battery for storing electric power;
a rear body rotatably supporting a pair of left and right rear wheels as the drive wheels; and
a connecting mechanism for swingably connecting the rear body with a front body so as to tilt the front body from side to side while the rear wheels are brought into contact with the ground;

wherein the secondary battery is disposed above the rear wheels;

said motor control unit including at least a motor driver and a CPU; and the drive motor and the motor control unit are provided between the left and right rear wheels in the rear body, the drive motor being positioned such that an axial centerline of the drive motor is offset toward a rear of the vehicle with respect to a position of a rear axle on which the rear wheels are mounted.

2. The electric-motor three-wheeled vehicle according to claim 1, further comprising:

a fuel cell for generating electric power resulting from chemical reaction between fuel gas and reaction gas;

wherein the fuel cell is provided in the front body; and the secondary battery stores the electric power generated by the fuel cell.

3. The electric-motor three-wheeled vehicle according to claim 2, and further comprising:

a voltage converter for increasing or decreasing the voltage of the electric power supplied from the fuel cell;

wherein the voltage converter is disposed between the left and right rear wheels in the rear body in a position that is forward with respect to the drive motor and the CPU.

4. The electric-motor three-wheeled vehicle according to claim 3, and further comprising:

an actuator at least including a supercharger for supplying the reaction gas to the fuel cell and an electric pump for supplying under pressure cooling water of the fuel cell; and a control driver for controlling the actuator;

wherein the control driver is disposed between the left and right rear wheels in the rear body.

5. The electric-motor three-wheeled vehicle according to claim 3, wherein the rear body is provided with a protection. member that externally surrounds at least a portion of electric components mounted between the left and right rear wheels.

6. The electric-motor three-wheeled vehicle according to claim 2, and further comprising:

an actuator at least including a supercharger for supplying the reaction gas to the fuel cell and an electric pump for supplying under pressure cooling water of the fuel cell; and a control driver for controlling the actuator;

wherein the control driver is disposed between the left and right rear wheels in the rear body.

7. The electric-motor three-wheeled vehicle according to claim 6, wherein the motor control unit, the voltage converter and the control driver are concentratedly arranged adjacent to each other.

8. The electric-motor three-wheeled vehicle according to claim 6, wherein the rear body is provided with a protection member that externally surrounds at least a portion of electric components mounted between the left and right rear wheels.

9. The electric-motor three-wheeled vehicle according to claim 2, wherein the rear body is provided with a protection member that externally surrounds at least a portion of electric components mounted between the left and right rear wheels.

10. The electric-motor three-wheeled vehicle according to claim 1, wherein the secondary battery is disposed in a luggage carrier above the rear wheels.

11. The electric-motor three-wheeled vehicle according to claim 1, wherein the rear body is provided with a protection member that externally surrounds at least a portion of electric components mounted between the left and right rear wheels, wherein the protection member includes a left sub-frame with an inverted U-shape extending upwardly from a left side of the rear body between the drive motor and the left rear wheel, a right sub-frame with an inverted U-shape extending upwardly from a right side of the rear body between the drive motor and the right rear wheel, the left and right sub-frames being connected to each other by a connecting pipe extending vehicle-widthwise to protect the electric components from above.

12. The electric-motor three-wheeled vehicle according to claim 11, wherein the electrical components protected by the protection member include a voltage converter and a control driver concentratedly arranged adjacent to each other.

13. The electric-motor three-wheeled vehicle according to claim 12, wherein the rear axle on which the left and right rear wheels are mounted extends through each of the left and right sub-frames.

14. An electric-motor three-wheeled vehicle comprising:

a front body;

a rear body supporting a pair of left and right rear wheels as drive wheels;

a connecting mechanism for swingably connecting the rear body with the front body so as to tilt the front body from side to side while the rear wheels are brought into contact with the ground;

a drive motor operatively connected for supplying a driving. force to the drive wheels of the vehicle;

a motor control unit for controlling the drive motor, said motor control unit including at least a motor driver and a CPU and said motor and the motor control unit being provided between the left and right rear wheels in the rear body; the drive motor being positioned such that an axial centerline of the drive motor is offset toward a rear of the vehicle with respect to a position of a rear axle on which the rear wheels are mounted motor, and a secondary battery for storing electric power, said secondary battery being disposed above the rear wheels.

15. The electric-motor three-wheeled vehicle according to claim 14, further comprising:

a fuel cell for generating electric power resulting from chemical reaction between fuel gas and reaction gas;

wherein the fuel cell is provided in the front body; and the secondary battery stores the electric power generated by the fuel cell.

16. The electric-motor three-wheeled vehicle according to claim 15, and further comprising:

an actuator at least including a supercharger for supplying the reaction gas to the fuel cell and an electric pump for supplying under pressure cooling water of the fuel cell; and a control driver for controlling the actuator;

wherein the control driver is disposed between the left and right rear wheels in the rear body.

17. The electric-motor three-wheeled vehicle according to claim 14, and further comprising:

a voltage converter for increasing or decreasing the voltage of the electric power supplied from a fuel cell;

wherein the voltage converter is disposed between the left and right rear wheels in the rear body.

18. The electric-motor three-wheeled vehicle according to claim 14, and further comprising:

an actuator at least including a supercharger for supplying the reaction gas to the fuel cell and an electric pump for supplying under pressure cooling water of a fuel cell; and a control driver for controlling the actuator;

wherein the control driver is disposed between the left and right rear wheels in the rear body.

19. The electric-motor three-wheeled vehicle according to claim 14, wherein the rear body is provided with a protection member that externally surrounds at least a portion of electric components mounted between the left and right rear wheels, wherein the protection member includes a left sub-frame with an inverted U-shape extending upwardly from a left side of the rear body between the drive motor and the left rear wheel, a right sub-frame with an inverted U-shape extending upwardly from a right side of the rear body between the drive motor and the right rear wheel, the left and right sub-frames being connected to each other by a connecting pipe extending vehicle-widthwise to protect the electric components from above.

20. The electric-motor three-wheeled vehicle according to claim 19, wherein the electrical components protected by the protection member include a voltage converter and a control driver concentratedly arranged adjacent to each other.

* * * * *